United States Patent
Ishihara (10) Patent No.: US 6,709,158 B2
(45) Date of Patent: Mar. 23, 2004

(54) LINEAR MOTION GUIDE UNIT WITH SEPARATOR BETWEEN ANY TWO ADJOINING ROLLERS

(75) Inventor: Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 16 days.

(21) Appl. No.: 10/150,948

(22) Filed: May 21, 2002

(65) Prior Publication Data

US 2003/0179962 A1 Sep. 25, 2003

(30) Foreign Application Priority Data

Mar. 22, 2002 (JP) ........................................ 2002-080609

(51) Int. Cl.[7] .............................................. F16C 29/06
(52) U.S. Cl. ........................................... 384/44; 384/51
(58) Field of Search ............................. 384/43, 44, 45, 384/51

(56) References Cited

U.S. PATENT DOCUMENTS

| | | | | |
|---|---|---|---|---|
| 3,219,398 A | * | 11/1965 | Anderson | 384/44 |
| 4,687,345 A | * | 8/1987 | Geka | 384/44 |
| 4,896,974 A | * | 1/1990 | Shimizu | 384/47 |
| 6,419,069 B1 | * | 7/2002 | Teramachi | 384/44 |

FOREIGN PATENT DOCUMENTS

| | | |
|---|---|---|
| JP | 26017/1989 | 1/1989 |
| JP | 314420/2000 | 11/2000 |
| JP | 132745/2001 | 5/2001 |

* cited by examiner

Primary Examiner—Thomas R. Hannon
(74) Attorney, Agent, or Firm—Browdy and Neimark, P.L.L.C.

(57) ABSTRACT

A linear motion guide unit is disclosed in which a separator interposed between any two adjoining rollers fits over or embraces the rollers flanking the separator, thereby realizing low noise and low wear. The separator lying between any two adjoining rollers is made concaved at forward and aft sides thereof to fit snugly over the rollers in rolling-contact relation. The separator is made with a sunken relief on at least an inward side thereof, which is near a radially inside curved surface in the turnaround, the sunken relief extending lengthwise of the separator and being provided by making the separator reduced in width lest the separator comes in engagement with the radially inside curved surface in the turnaround. A gutter for relief is cut in the radially inside curved surface in the turnaround in a way extending circumferentially along the turnaround, thereby keeping the separator from coming in any interference with the radially inside curved surface in the turnaround when the separator travels through the turnaround.

14 Claims, 5 Drawing Sheets

LINEAR MOTION GUIDE UNIT WITH SEPARATOR BETWEEN ANY TWO ADJOINING ROLLERS

BACKGROUND OF THE INVENTION

1. Field of the Invention

The present invention relates generally to a linear motion guide unit adapted for use in various types of machinery such as semiconductor manufacturing machines, precision measuring instruments, inspection equipment, precision assembly machines and, more particularly, to a linear motion guide unit in which a slider is movable on an elongated track rail by virtue of rollers that are allowed to run through recirculating circuits, together with separators each interposed between any two adjacent rollers.

2. Description of the Prior Art

Although current linear motion guide units have been used extensively in diverse fields of machinery such as semiconductor manufacturing machines, measuring/inspection instruments, and so on, the scope of their useful applications is still expanding with the development of technology. To this end, the linear motion guide units are seeing growing demands for less noise or vibration, reduction of wear, long-lasting service life, high precision, high-speed sliding motion, easy assembly, versatile usage, and so on. In recent years, especially, the linear motion guide unit is much expected in which separators are each interposed between any two adjoining rolling elements to lower noise, reducing wear thereby realizing long-lasting service life.

Disclosed in Japanese Patent Laid-Open No. 132745/2001 is a linear motion rolling guide unit in which flanged separators are each interposed between any two adjoining rollers, with their flanges coming into engagement with axially opposite ends of the rollers to keep the separators against axial deviation or offset thereby to make certain of smooth sliding movement with no noise of the separators. With the prior linear motion rolling guide unit recited earlier, the separators are each composed of a major body made concaved at opposite sides thereof to accommodate therein the adjacent rollers in a rolling contact relation, one to each side, and flanges arranged at the axial opposite ends of the major body, one to each end, in a way extending in opposite directions to each other along the moving direction of the rollers to come into face-to-face engagement with their associated axial ends of the adjacent rollers. The separator constructed as stated just above may be well kept against any offset in axial direction of the roller with no need of specific guide member, because the roller rolls in a condition that they are regulated at their axial opposite ends to run through a recirculating circuit. In the prior linear motion rolling guide unit in which the separators have flanges on their axial ends, there is a major drawback that the recirculating circuit has to be made large in width by thickness of the flanges on the separators, compared with the linear motion guide unit of the sort having no separator. Moreover, the separator recited earlier is disadvantageously made too smaller in outside periphery diameter than the roller to embrace the associated rollers therein.

In Japanese Patent Laid-Open No. 26017/1989 there is disclosed a rolling means to guide parts in linear direction, in which many rollers are held by means of spacers that come in engagement at their sidewise ends thereof with recesses formed in skids. The spacers are each made sidewise extended beyond opposite axial ends of the roller to form sidewise opposed lugs, which come in engagement with the recesses formed inside recirculating grooves in the skids, thereby holding the rollers in place. With the rolling means constructed as recited earlier, the troublesome work must be done to provide sidewise lugs for the spacers. Moreover, the recesses in which the lugs of the spacers fit in a sliding engagement have to be cut into the overall inside of the recirculating grooves. The lugs of the spacers are sensitive to be subject to damage such as wear that might be caused by the continuous sliding engagement with the inside surfaces of the recesses.

Another prior linear motion system disclosed in Japanese Patent Laid-Open No. 314420/2000 has spacers for linear motion, which are each interposed between any two adjoining rollers. The spacer is made hollow to experience elastic deformation in moving direction of the rollers and also is provided at the center thereof with a guide plate extending radially outwardly into a guide channel that is cut in the moving direction in an inside periphery of a recirculating circuit where the rollers run through there. In this prior linear motion guide unit, however, the spacer has to be designed lest it comes in interference at any edge thereof with the inside surface of the roller-recirculating circuit. The troublesome work is further needed to cut the guide channel, in which the guide plate fits for free movement, in the overall inside surface of the roller-recirculating circuit. Moreover, the guide plate is apt to be subject to damage such as wear, since the guide plate comes most often in sliding engagement with the walls in the associated guide channel, but not always.

Nevertheless, the current linear motion guide units, as coming used in the machines that are getting faster in operating speed and cycle, must be further refined on quietness, high accuracy and wear proof in operation. With the prior linear motion guide unit having any separator interposed between two adjoining rollers, moreover, any construction that the separator travels with keeping to fit snugly over the rollers flanking the forward and aft ends of the separator is critical for making sure of steady movement of the rolling elements throughout the roller-recirculating circuit even under modern high-speed operation. For allowing the separator in the linear motion guide unit to move with fitting over the associated rollers, it will be sufficient only to get the separator concaved on the forward and aft sides thereof flanking the adjacent rollers and made large in outside diameter to what extent the separator may fit over the overall roller.

As the separator travels in a sliding manner as opposed to the roller that moves in rolling manner, however, the separators made large in outside diameter would pose a major problem that they, when traveling through a turnaround in the recirculating circuit, might tend to experience an interference with an inside surface of the turnaround, incurring travel failure. Thus, it remains a major challenge to provide the separator that, even though made large in outside diameter enough to fit over the overall roller, is allowed to recirculate steady, smoothly together with the rollers flanking the forward and aft sides of the separator through, especially, the turnaround in the roller-recirculating circuit.

Recently many types of linear motion guide units have been developed in which separators are each interposed between any two adjoining rollers to lessen noise and wear, and increase life span of the associated parts. Especially the present inventor has already developed a linear motion guide unit in which more than one separator made large in outside diameter thereof is interposed between any two adjoining rolling elements of balls. This linear motion guide unit was filed in Japan in the name of the present applicant under Patent Application No. 2001-391276. With the linear motion guide unit that the separator made large in outside diameter are interposed between any two adjoining balls as recited just above, the turnaround is made on a radially inside curved surface thereof with a gutter for relief to make certain that the separator is allowed to travel through the turnaround without seeing any interference with the inside surface of the turnaround. Application of the technical conception developed earlier to a linear motion guide unit using rollers rather than balls for the rolling elements has resulted in the development of the present invention about how to define the relation of the separator with the turnaround in the roller-recirculating circuit.

SUMMARY OF THE INVENTION

The present invention, therefore, has as its primary object to overcome the major problem discussed earlier and in particular to provide a linear motion guide unit in which a separator interposed between any two adjoining rollers fits over or embraces substantially the overall semicylindrical surface of each roller to be allowed to run together with the rollers steady, smoothly through a roller-recirculating circuit, especially through a turnaround without causing rattling sound between the separator and the rollers flanking the separator, thereby making sure of realizing the reduction of noise and wear, and the high accuracy of operation. To make certain that the separator, even though made large in outside diameter thereof, is allowed to travel smoothly through the turnaround in the recirculating circuit, especially according to the present invention, a linear motion guide unit is provided in which the turnaround is made on a radially inside curved surface thereof with a gutter for relief, while the separator is made with a sunken relief whereby the separator is helped to move smoothly together with the roller through the turnaround in the recirculating circuit.

The present invention is concerned with a linear motion guide unit comprising; a track rail having a lengthwise side on which a first raceway extends lengthwise thereof, a slider having a second raceway confronting the first raceway and lying for sliding movement relatively to the track rail by virtue of more than one roller that are allowed to roll through a load racecourse defined between the first and second raceways, a separator interposed between any two adjoining rollers so as to be allowed to recirculate together with the rollers through a recirculating circuit that is composed of the load racecourse, turnarounds made in the slider to be connected with the load racecourse, and a return passage made in the slider to be connected with the turnarounds; wherein the separator is made concaved on forward and aft sides flanked by the adjacent rollers to provide concave surfaces that fit over the rollers in rolling-contact relation, the concave surface having a length and a width that are able to fit over substantially overall semicircular surface of the roller.

In one aspect of the present invention, a linear motion guide unit is provided in which the separator has the width making up substantially about 96% of a diameter of the roller and the length reaching substantially about 98% of an axial length of the roller.

In another aspect of the present invention, a linear motion guide unit is provided in which the separator is made with a sunken relief on at least an inward side thereof, which is near a radially inside curved surface in the turnaround, the sunken relief extending lengthwise of the separator and being provided by making the separator reduced in width lest the separator comes in engagement with the radially inside curved surface in the turnaround.

In another aspect of the present invention, there is provided a linear motion guide unit wherein a gutter for relief is cut in the radially inside curved surface in the turnaround in a way extending circumferentially along the turnaround, thereby keeping the separator from coming in any interference with the radially inside curved surface in the turnaround when the separator travels through the turnaround.

In another aspect of the present invention, there is provided a linear motion guide unit wherein the sunken relief made on the separator to keep the separator from coming in any interference with the radially inside curved surface in the turnaround lies midway between lengthwise ends of the separator, while gutters for relief cut in the radially inside curved surface in the turnaround are placed at sidewise opposite sides of the radially inside curved surface in the turnaround, one to each side, to keep the radially inside curved surface in the turnaround from coming in any interference with the separator at raised portions that are left on lengthwise opposite ends across the sunken relief of the separator.

In a further another aspect of the present invention, there is provided a linear motion guide unit in which sunken relieves made on the separator to keep the separator from coming in any interference with the radially inside curved surface in the turnaround lie on the lengthwise ends of the separator, one to each end, while the gutter for relief cut in the radially inside curved surface in the turnaround is placed midway between the opposite sides of the radially inside curved surface in the turnaround to keep the radially inside curved surface in the turnaround from coming in any interference with the separator at a raised portions that are left midway between the lengthwise opposite sunken relieves of the separator.

In another aspect of the present invention, a linear motion guide unit is provided in which the separator is made in symmetry on sidewise opposite sides of an axis. With the linear motion guide unit constructed as stated just above, the separator may be made simple in construction, much easy in production, and also may be assembled easily between the adjacent rollers with no need for considering the direction of what it should.

In another aspect of the present invention, a linear motion guide unit is provided in which the slider is comprised of a carriage including therein the second raceway and the return passage, end caps mounted on forward and aft ends of the carriage, one to each end, and each made therein with turnarounds where the separators together with the rollers are allowed to turn round in rolling direction, end seals attached on end surfaces of the end caps, one to each cap, and a retainer plate fastened to the carriage to extend lengthwise along the carriage to support thereon the rollers.

In another aspect of the present invention, a linear motion guide unit is provided in which the end caps are each made up of an end cap body and a spacer, which are attached to any one of the forward and aft ends of the carriage, the spacer being to provide the radially inside curved surface of the turnaround, which is partially sunken in to form the gutter for relief, and an end cap body being to provide a radially outside curved surface of the turnaround.

In another aspect of the present invention, there is provided a linear motion guide unit in which the spacer, especially, includes a straight area to be conjoined with at least the second raceway on the carriage in flush with one another, and a curved area merging with the straight area. Moreover, the curved area in the spacer is formed in either the overall circular shape or another shape that is made up of sidewise opposite arcs and a linear area lying midway between the arcs.

In another aspect of the present invention, a linear motion guide unit is provided in which the gutter for relief formed on the spacer starts with a slope made in the straight area and extends circumferentially along the curved area of the spacer. According to the aspect of the present invention as stated just earlier, smooth rolling of the rollers through the recirculating circuit would be realized by simply forming the slope on the straight area in the resin-made spacer of the end cap, rather than chamfering the metal-made carriage at the forward and ends to be opened to the associated turnaround.

In a further another aspect of the present invention, a linear motion guide unit is provided in which the track rail is made on a lengthwise side thereof with a first groove to hold therein the retainer plate, the groove being flanked with the first raceways, while the carriage is also made with a second groove to hold the retainer plate, the second groove being flanked with the second raceways lying confronting the first raceways on the track rail.

In another aspect of the present invention there is provided a linear motion guide unit in which the slider fits over astride the track rail for linear motion relatively to the track rail.

With the linear motion guide unit constructed as stated earlier, the separator interposed between any two adjoining rollers is made large in size enough to fit over or embrace substantially the overall cylindrical surfaces of the rollers flanking the separator. Moreover, the gutter for relief is provided on the spacer that defines the radially inside curved surface of the turnaround in the end cap while the sunken relief is provided on the separator lest the large separator comes in any interference with the radially inside curved surface in the turnaround when the separator travels through the turnaround. Thus, the linear motion guide unit of the present invention, even though used at any posture of the vertical, upside down or tilted posture, and so on rather than the horizontal, makes certain of smooth rolling of the rollers through the circulating circuit without causing any chatter or rattling whenever the rollers travel together with the separators. Complementary relation of the gutter for relief extending circumferentially of the radially inside curved surface in the turnaround to the sunken gutter on the separator, moreover, keeps the separator from coming in any interference with the radially inside curved surface in the turnaround. This construction can realize less noise or vibration, reduction of wear, high precision and long-lasting service life, and so on, with even high-speed, high-cycle operation of the rollers in the recirculating circuit.

DETAILED DESCRIPTION OF THE PREFERRED EMBODIMENTS

Referring now in detail to the drawings, there is shown a linear motion guide unit according to the present invention, in which a separator is interposed between any two adjoining rollers. The linear motion guide unit discussed later is envisaged to meet functional demands: high-speed, high-cycle sliding motion, wear-resistance, and so on, which will be expected for diverse machines such as semiconductor manufacturing machines, precision measuring instruments, precision inspection instruments, precision assembly machines, machine tools, industrial robots, and so on, which are made in a wide range of sizes, from very small instruments to very large machines.

Figure 1:
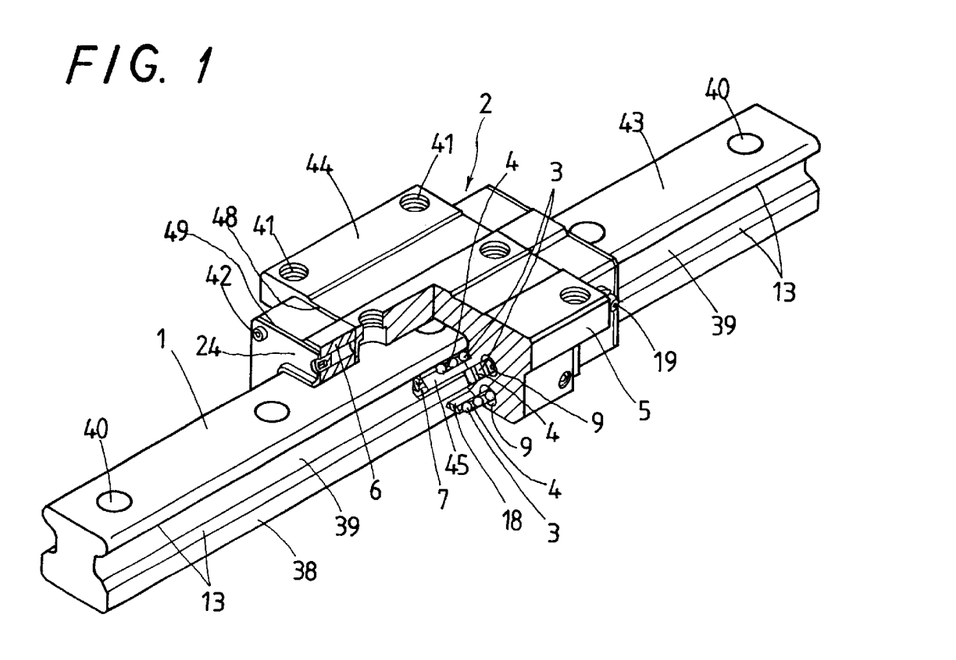
FIG. 1 is a perspective view, partially broken away, showing a preferred embodiment of a linear motion guide unit according to the present invention.

The illustrative linear motion guide unit is used in a way interposed between any stationary side such as a machine bed and a counterpart such as a work table movable relatively to the stationary side, and is chiefly comprised of an elongated track rail 1 and a slider 12 that fits over and conforms to the track rail 1 for sliding movement with respect to the track rail 1 as seen from FIG. 1. With the linear motion guide unit illustrated here, more than one rolling element rolling in a load racecourse 10 defined between the track rail 1 and the slider 2 is a roller 3 while separators 4 are each interposed between any two adjoining rollers 3. It is to be especially noted that the separator 4 is so made as to travel together with the rollers 3 through a recirculating circuit, which will be stated later, in such a manner fitting over or embracing the rollers 3.

The linear motion guide unit according to the present invention features that the separator 4 interposed between the adjoining rollers 3 is made large enough to fit over the rollers 3 flanking forward and aft sides of the separator 4 to make sure of smooth recirculation of the roller 3 even under high-speed operation. The track rail 1 is made on an upper surface 43 thereof with bolt holes 40 positioned lengthwise at regular intervals, in which bolts fit to fasten the track rail 1 on any machine bed. The slider 2 is also made on a top face 44 thereof with more than one threaded-holes 41 where fastening screws are driven to join together the slider 2 with any object such as a table. Thus, the movement of the slider 2 relatively to the track rail 1 makes the table travel with respect to the machine bed.

Figure 2:
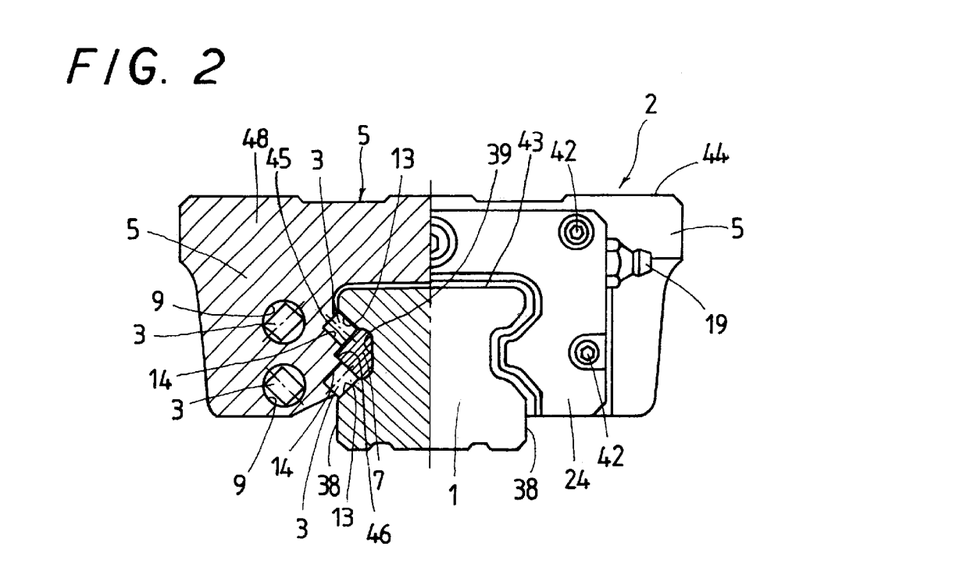
FIG. 2 is a front elevation, widthwise half in cross section, of the linear motion guide unit shown in FIG. 1.
Figure 3:
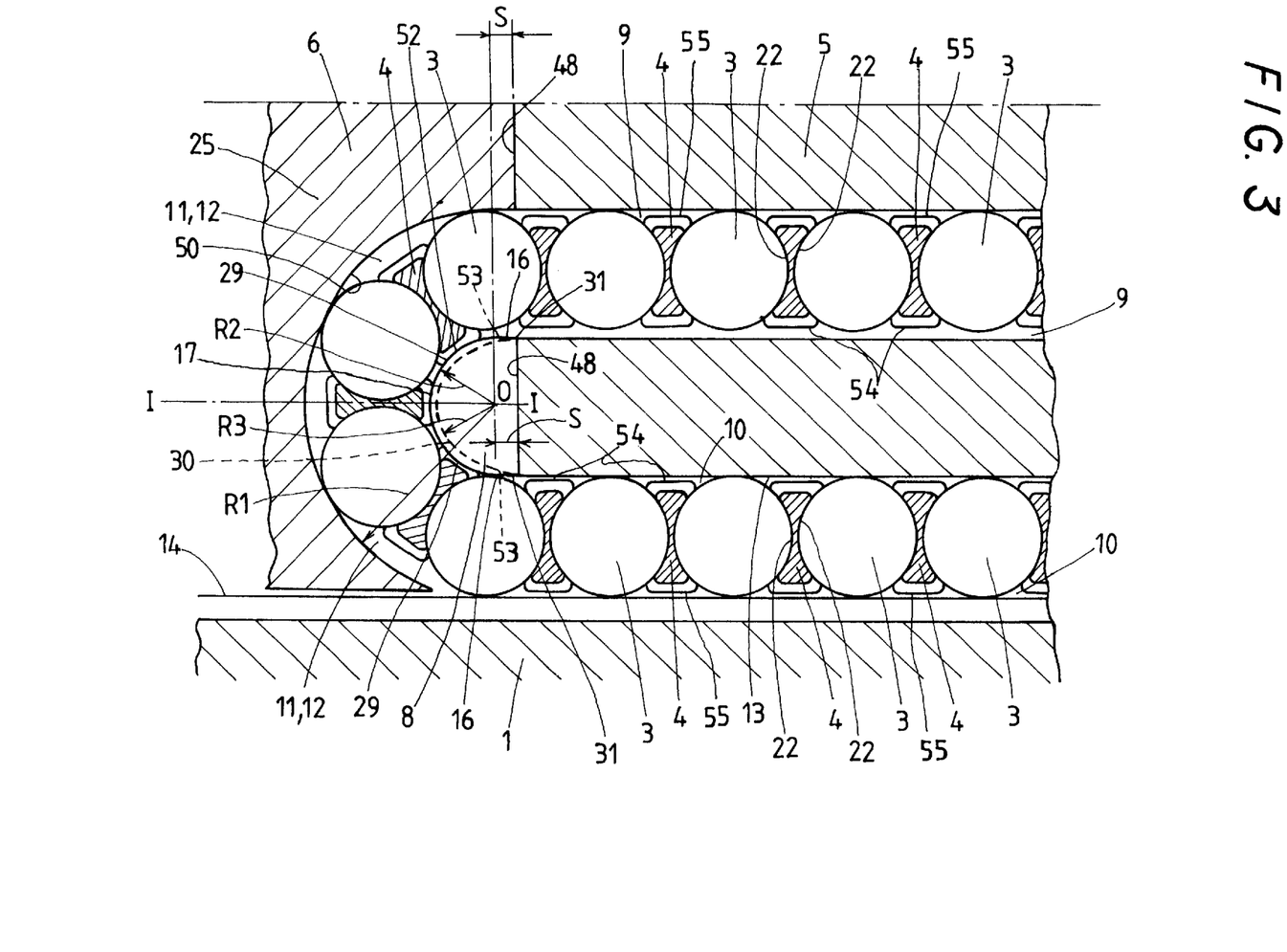
FIG. 3 is an enlarged fragmentary sectional view explanatory of a recirculating circuit in the linear motion guide unit shown in FIG. 1, the view being taken along a plane lying midway in an axial direction of rollers.

As seen from FIGS. 1 and 2, the track rail 1 has lengthwise major grooves 39 on widthwise opposite sides 38 thereof, one to each side. There is provided a pair of first raceways 13 on each major groove 39. The slider 2 is also made with fore-and-aft minor grooves 46 lying in opposition to the major grooves 39. The minor grooves 46 are each flanked with second raceways 14 that lie confronting the first raceways 13 on the track rail 1. A roller-recirculating circuit where the separators 4 are allowed to run together with the rollers 3 through there, as shown in FIG. 3, is made up of a load racecourse 10 defined between the first raceway 13 and the second raceway 14, turnarounds 11, 12 formed in the slider 2 so as to come in connection with the load racecourse 10, and a return passage 9 formed in the slider 2 and connected with the turnarounds 11, 12, respectively. With the linear motion guide unit of the present invention, the rollers 3 are allowed to roll through the recirculating circuit, with being kept in isolation from one another by means of the separators 4 that are each interposed between any two adjoining rollers 3 to fit over or embrace the associated rollers 3, thereby materializing any desired smooth rolling of the rollers 3 together with the separators 4.

The slider 2 is chiefly comprised of a carriage 5, end caps 6 mounted on forward and aft ends 48 of the carriage 5, one to each end, end seals 24 attached on end surfaces 49 of the end caps 6, one to each cap, and a retainer plate 7 to support thereon any one of axial ends of each roller 3. The carriage 5 includes therein a pair of raceways 14 formed confronting the paired raceways 13 on the track rail 1, one to each raceway 13, and a pair of return passages 9 to allow the rollers 3 to run through there together with the separators 4. The end caps 6 are each made therein with turnarounds 11, 12 to connect the paired load racecourses 10 with the paired return passages 9, respectively, thereby allowing the rollers 3 to turn round in rolling direction. Moreover, the retainer plate 7 extends lengthwise along the raceways 14 to provide a bearing surface 45 to support thereon any one of axial ends of each roller 3 and fits closely in the minor groove 46 in the carriage 5 to be held in place. Thus, any one of the paired recirculating circuits is made up of the load racecourse 10 defined between the raceway 13 on the track rail 1 and the raceway 14 in the carriage 5, and a non-loaded racecourse including the return passage 9 formed in the carriage 5 and the turnarounds 11, 12 formed in the end caps 6 to communicate the load racecourse 10 with the return passage 9.

With the linear motion guide unit constructed as stated earlier, the raceways 13 on the track rail 1 are made to lie lengthwise on both sides of the major groove 39, one to each side, which is formed lengthwise on the associated side of the track rail 1 to hold therein the retainer plate 7, while the raceways 14 in the carriage 5 are arranged to lie lengthwise on both sides of the minor groove 39, one to each side, which is formed lengthwise in the carriage 5 to hold therein the retainer plate 7, in opposition to the raceways 13.

Figure 8:
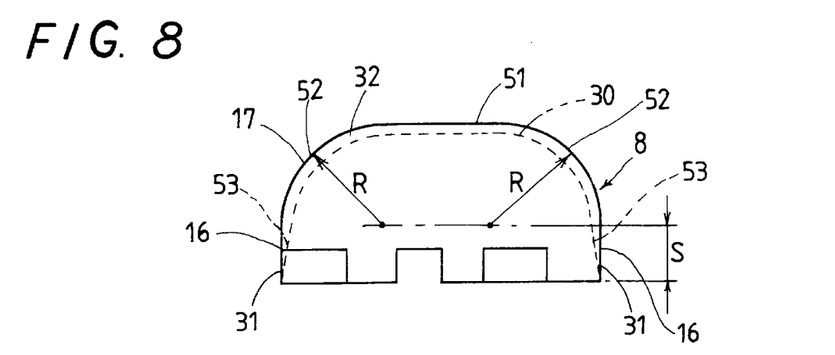
FIG. 8 is a front elevation of a spacer to be incorporated in a turnaround formed in the end cap of FIG. 7.
Figure 9:
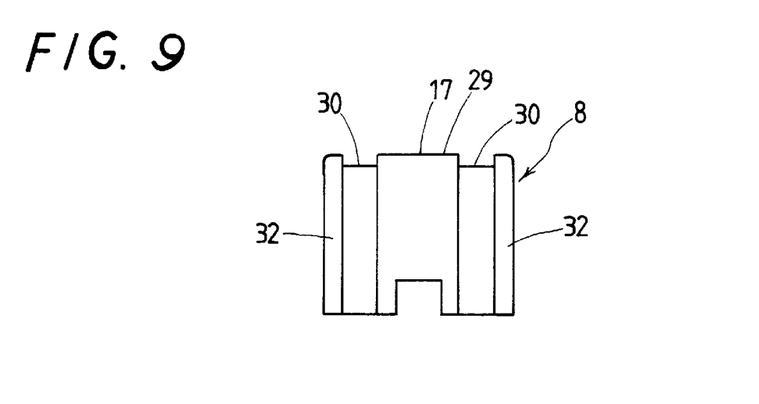
FIG. 9 is a side elevation of the spacer in FIG. 8.

The present linear motion guide unit features that the turnarounds 11, 12 provided in the slider 2, as shown in FIG. 3, are each made at a radially inside curved surface 29 thereof with a gutter 30 for relief in a way extending in a traveling direction of the rollers 3 to keep the separator 4 from coming in any interference with the turnarounds 11, 12, which might otherwise occur when the separator 4 travels through the turnarounds 11, 12. The end cap 6 fastened on any one of the forward and aft ends 48 of the carriage 5, as shown in FIGS. 3 and 7 to 9, is composed of a spacer 8 to provide the radially inside curved surface 29 common to the turnarounds 11, 12, which is partially sunken in to form the gutters 30 for relief, and an end cap body 25 to provide a radially outside curved surface 50 common to the turnarounds 11, 12. The spacer 8, as seen from FIGS. 3 and 8, includes a straight area 16 to be conjoined with the associated raceway 14 on the carriage 5 in flush with one another, and a curved area 17 merging with the straight area 16. On sidewise opposite ends of the spacer 8, as shown in FIG. 9, there are provided banks 32 serving as a fitting construction that fits in a mouth, not shown, of the end cap body 25.

Now assuming that the curved area 17 of the spacer 8 is made in a semicircular curvature having a center 0, the turnarounds 11, 12 formed in the end cap 6 will each lie between a radially outside curved surface having a major radius R1 of curvature and a radially inside curved surface having a minor radius R2 of curvature, as apparent from FIG. 3. With the turnarounds 11, 12 defined as stated just earlier, the gutter 30 for relief sunk in to a radius R3 of curvature needs to be extended over a circular range starting in front of an entry of the curved area 17 and terminating somewhere past the end of the curved area 17 in order to make sure of keeping the separator 4 against any interference with the radially inside curved surface 29 at the curved area 17. That is to say, the gutter 30 for relief needs to be flanked by transit areas in depth: a head 31 and a tail 31, which are made gradual slopes 53 in depth getting to a sunken bottom lying on the radius R3 of curvature to provide smooth conjunction with no irregularity between the gutter 30 for relief and either of the load racecourse 10 and the return passage 9. Even if there were any irregularity or off-flush at ingress and/or egress of the gutter 30 for relief rather than the slopes 53, the separator 4 would experience any interference with the radially inside curved surface in the turnaround 11(12) at the ingress and/or the egress of the curved area 17, thus resulting in the occurrence of chatter or rattling noise.

Figure 4:
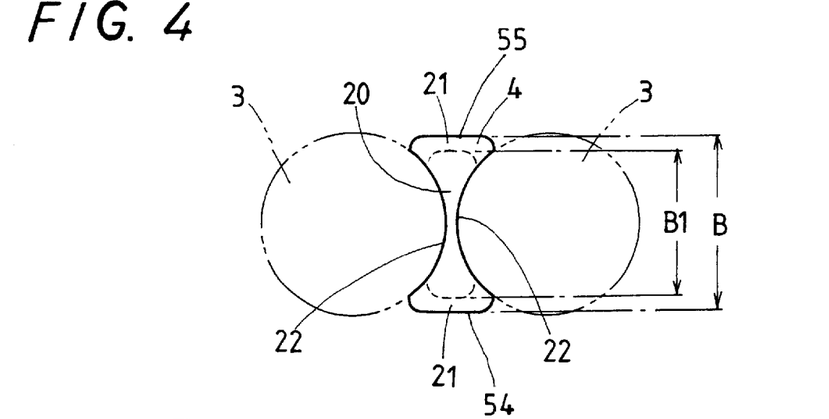
FIG. 4 is a front elevation of a separator interposed between any two adjoining rollers in the linear motion guide unit of FIG. 1.
Figure 5:
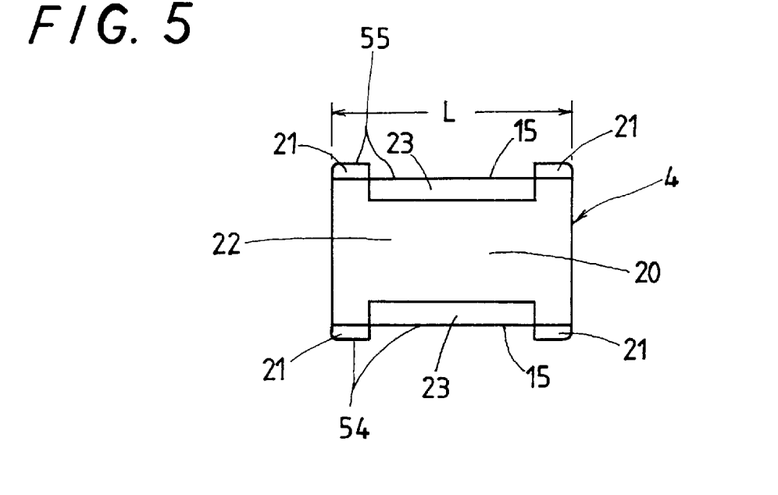
FIG. 5 is a side elevation of the separator shown in FIG. 4.
Figure 6:
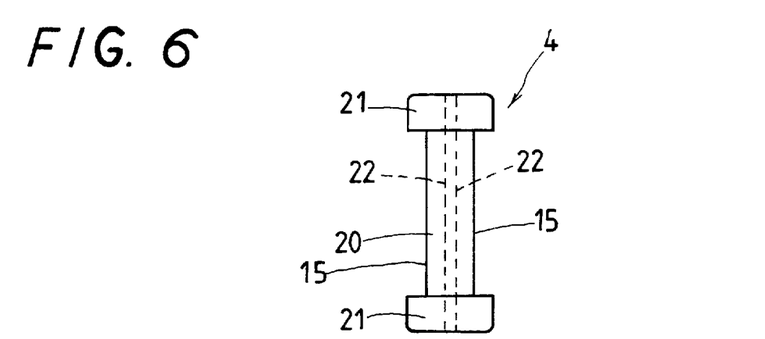
FIG. 6 is a top plan view showing the separator of FIG. 4.
Figure 7:
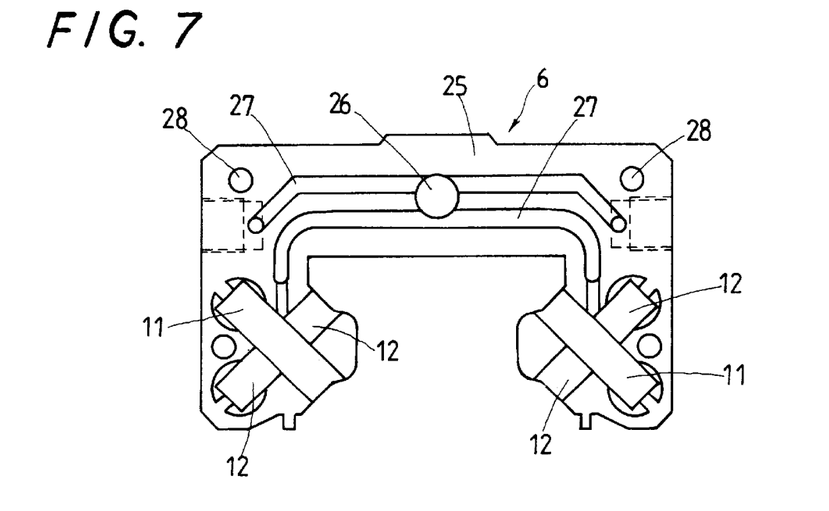
FIG. 7 is a rear elevation showing an end cap of the linear motion guide unit shown in FIG. 1.

More than one the separator 4 interposed between any two adjoining rollers 3 in the present linear motion guide unit, as shown in FIGS. 3 and 4 is made concaved on forward and aft sides flanked by the adjacent rollers 3 to provide concave sides 22 that fit over the rollers 3 in rolling-contact relation. Especially, it is to be noted that the concave sides 22 of the separator 4 flanked by the adjacent rollers 3 are each made large to the extent enough to fit over the overall associated roller 3. This, in other words, means the separator 4 is rendered large in both length and width to the extent enough to be able to fit over or embrace substantially the overall semicylindrical area of the associated roller 3. It will be thus understood that the concave sides 22 on the separator 4 need making as large as possible in size so long as they are somewhat less in size than the diameter and axial length of the roller 3. It is really preferred that the separator 4, as shown in FIGS. 4 to 6, has a width B making up substantially about 96% of the diameter of the roller 3 and a length L reaching substantially about 98% of the axial length of the roller 3. The concave sides 22 of the separator 4 are made tapered or chamfered at their circumferential edges 23 to avoid the occurrence of biting engagement that might otherwise occur between the separator 4 and the any roller 3 that comes in rolling contact with the separator 4, thereby making sure of smooth rolling of the rollers 3.

Figure 10:
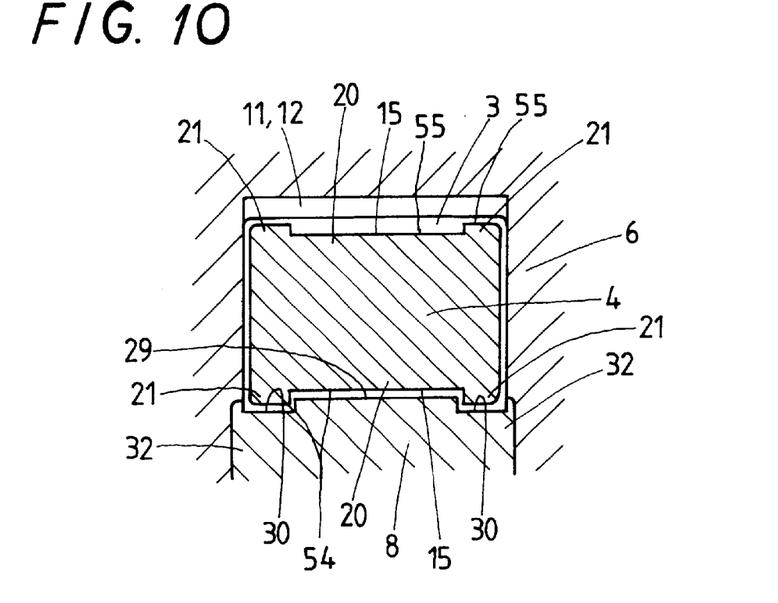
FIG. 10 is a fragmentary sectional view explaining an embodiment of the separator in the turnaround, the view being taken along the plane lying on the line I—I of FIG. 3.

The present linear motion guide unit features that the separator 4, as seen from FIGS. 4 and 5, is made therein with a sunken relief 15 extending lengthwise of the separator 4. Moreover, the sunken relief 15 lies on at least one side 54 thereof, which is situated near the radially inside curved surface 29 in the turnaround 11(12), making certain that the separator 4 avoids going into any interference with the radially inside curved surface 29 in the turnaround 11(12) of the slider 2. The separator is made up of a major portion 20 having thereon the sunken relief 15 and tapered edges 23, and flanges 21 arranged on lengthwise opposite ends of the major portion 20. The concaved surfaces 22 on the separator 4 are each formed in a way extending lengthwise throughout both of the major portion 20 and the flanges 21. It is preferred that the separator 4 is also made with the same sunken relief 15 on a radially outward side 55 or the side far away from the radially outside curved surface 29 in the turnarounds 11(12), so that the separator 4, even though being turned upside down, may be assembled well between the adjacent rollers 3 in the recirculating circuit. Moreover, the sunken relief 15, as shown in FIGS. 4 to 6, is formed to lie substantially midway between the lengthwise opposite ends of the separator 4. On the thickness-wise opposite sides of the curved area 17 in the radially inside curved surface 29 of the turnaround 11(12) defined by the spacer 8 modified in shape as shown in FIGS. 8 to 10, there are also made the gutters 30 for relief in parallel with the sunken relief 15 of the separator 4. In the illustrated linear motion guide unit, the spacer shown in FIGS. 8 and 9, although different in shape from the spacer in FIG. 3, is denoted by the same reference numeral 8. The separator is made such that both the sunken relief 15 and the concaved surface 22 are symmetry on sidewise opposite sides of an axis. Thus, the separator 4 may be made simple in construction, much easy in production, and also may be assembled easily between the adjacent rollers 3 with no need for considering the direction of what it should.

The separator 4 made as large in size as stated earlier, when traveling through the turnaround 11(12) of the recirculating circuit in any circular direction, would most likely come in interference with the radially inside curved surface 29 of the turnarounds 11 (12). To cope with this, according to the present linear motion guide unit, the separator 4 is made, as shown in FIGS. 3 to 6 and 10, partially with the sunken relief 15 on at least the inward side 54 thereof, which is near the radially inside curved surface 29 in the turnarounds 11(12) lest the separator 4 comes in engagement with the radially inside curved surface 29 in the turnaround 11(12). As the separator 4 would also come in interference with the radially inside curved surface 29 in the turnarounds 11(12) at the residual part of the radially inward side 54 thereof, there is made a sunken relief 30 along the radially inside curved surface 29 in the turnarounds 11(12) as seen from FIGS. 3 and 8 to 10, lest the separator 4 comes in engagement at the residual part thereof with the radially inside curved surface 29 in the turnarounds 11, 12.

The spacer may be formed in either shape of the spacer 8 shown in FIG. 3 and the spacer 8 in FIG. 8. In the spacer 8 in FIG. 3, the curved area 17 for the spacer 8 is made in the overall circular shape 52, while the spacer 8 in FIG. 8 is made up of sidewise opposite arcs 52 and a linear area 51 lying midway between the arcs 52. The spacer 8 shown in FIG. 8, not simply the overall circular shape as in FIG. 3, is made in a composite shape to provide an alternative of the turnarounds 11(12), where the radially inside curved surface 29 includes the sidewise opposite arcs 52 each having a radius R of curvature, and the linear area 51 lying midway between the arcs 52. Although not shown, a further another modification of the turnarounds 11 (12) may be adopted in which two sidewise opposite curved areas are connected with one another through a linear area lying midway between the curved areas. The spacer 8 in FIG. 8 is also has the straight area 16 that is connected with the load racecourse 10 in the circulating circuit. Into the straight area 16 there is cut the slope 53 that starts at the end 31 of the gutter 30 for relief and conjoins to the gutter 30 for relief, which is cut in the associated arc 52.

With the present linear motion guide unit constructed as stated earlier, the gutter 30 for relief cut into the spacer 8 starts at any point in the straight area 16, sloping at 53 in depth, and extends circumferentially along the curved area 17. If someone could attempt, for example in preparation for the rolling elements of rollers to chamfer the carriage 5 made therein with the linear passage or the load racecourse 10 in the recirculating circuit, it would be very tough to chamfer precisely the carriage that is usually made of steel. With the linear motion guide unit of the present invention in which the turnarounds 11, 12 in the end cap 6 are defined between the end cap body 25 and the spacer 8 that are made of resinous material, thus, the spacer 8 has the straight area 16 merging with the curved area 17 that forms the radially inside curved surface in the turnarounds 11(12). The gutter 30 for relief is cut in the spacer 8 in a way starting at any point on the straight area 16, extending deeply along the slope 53 and reaching the depth enough to provide the desired gutter 30 at the curved area 17. Provision of the spacer 8 having the straight area 16 where there is cut the slope 53 conjoining with the gutter 30 for relief of the desired depth will eliminate the need for chamfering, as was the prior art, the carriage 5 having therein the load racecourse 10 of the recirculating circuit.

Referring to FIG. 10, there is shown an example of the combination of the separator 4 with the spacer 8. The separator 4 in FIG. 10 is made with the sunken relief 15 to keep the separator 4 from coming in any interference with the radially inside curved surface 29 in the turnaround 11(12). The sunken relief 15 is provided at the major portion 20 lying midway between the lengthwise opposite flanges 21. On the curved surface 17 of the spacer 8 forming the radially inside curved surface 29 in the turnaround 11(12) there are made the gutters 30 for relief, which are spaced away from one another sidewise of the radially inside curved surface 29 in the turnarounds 11(12) in parallel with the lengthwise opposing flanges 21 across the sunken relief 15 on the separator 4 so as to avoid any interference with the flanges 21 opposing each other across the sunken relief 15 on the separator 4.

Figure 11:
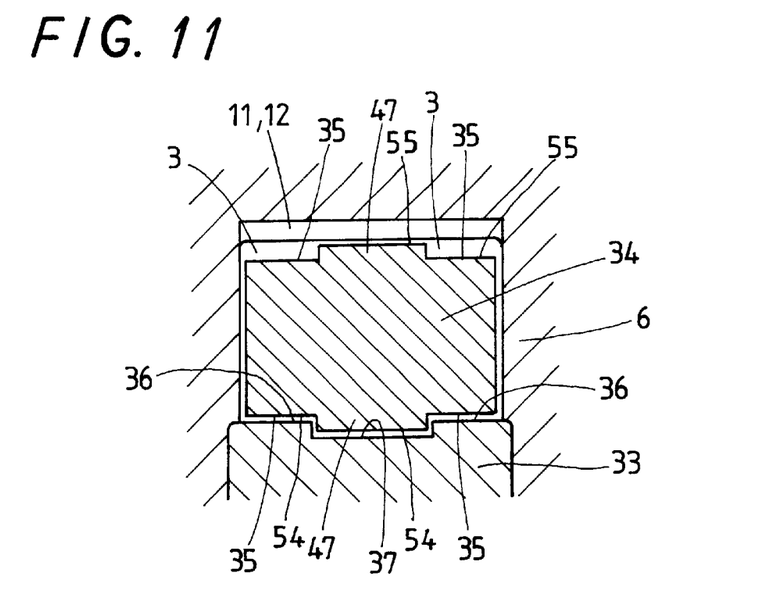
FIG. 11 is a sectional view showing the same area as in FIG. 10 to show another embodiment of the separator in the turnaround.

Referring next to FIG. 11, there is shown another example of the combination of a separator 34 with a spacer 33. The separator 34 in FIG. 11 is made with sunken relieves 35 opposing lengthwise of the separator 34 for keeping the separator 34 against any interference with a radially inside curved surface 36 in the turnaround 11(12). On the other hand, there is formed a gutter 35 for relief on the radially inside curved surface 36 in the turnaround 11(12). The gutter 35 for relief lies substantially midway between the opposite sides of the radially inside curved surface 36 in the turnaround 11(12), thereby getting clear of any interference of the radially inside curved surface 36 with a raised portion 47 left between the sunken relieves 35 on the separator 4. The separator 34 may be also made with the same sunken relieves 35 on the radially outward side 55 or the side far away from the radially outside curved surface 29 in the turnarounds 11, 12, so that the separator 34, even though being turned upside down, may be assembled well in the recirculating circuit. Thus, the separator 34, as being made symmetry on lengthwise opposite sides of an axis, may be made simple in construction, much easy in production, and also may be assembled easily between the adjacent rollers 3 with no need for considering the direction of what it should.

Moreover, the end cap 6 is secured to the carriage 5 together with the end seal 24 through a fastening bolt 42 that is fit in a bolt hole 28 aligned in the end cap 6 and the end seal 24. The carriage 5 is made with more than one threaded hole into which a fastening bolt is screwed.

With the linear motion guide unit constructed as stated earlier, a grease nipple 19 installed on the slider 2 to apply lubricant into the recirculating circuit fits in an opening 26 of the associated end cap 6 in a way extending outside from the end face of the associated end seal 24. Lubricant will be applied to the recirculating circuit from the grease nipple 19 through an oil path 27. Any clearance between the carriage 5 and the track rail 1 is covered with an upper seal, not shown, while any clearance lying between the slider 2 and the track rail 1 is sealed to keep the load racecourse 10 clean of foreign matter such as dust and dirt, which might otherwise invade there.

What is claimed is:

1. A linear motion guide unit comprising; a track rail having a lengthwise side on which a first raceway extends lengthwise thereof, a slider having a second raceway confronting the first raceway and lying for sliding movement relatively to the track rail by virtue of more than one roller that is allowed to roll through a load racecourse defined between the first and second raceways, a separator interposed between any two adjoining rollers so as to be allowed to recirculate together with the rollers through a recirculating circuit that is composed of the load racecourse, turnarounds made in the slider to be connected with the load racecourse, and a return passage made in the slider to be connected with the turnarounds;

wherein the separator is made concaved on forward and aft sides flanked by the adjacent rollers to provide concave surfaces that fit over the rollers in rolling contact relation, the concave surface having a length and a width that are able to fit substantially over a semicylindrical surface of the roller, wherein the separator is made with a sunken relief on at least an inward side thereof, which is near a radially inside curved surface in the turnaround, the sunken relief extending lengthwise of the separator and being provided by making the separator reduced in width lest the separator comes in engagement with the radially inside curved surface in the turnaround.

2. A linear motion guide unit constructed as defined in claim 1, wherein gutters for relief are cut in the radially inside curved surface in the turnaround in a way extending circumferentially along the turnaround, thereby keeping the separator from coming in any interference with the radially inside curved surface in the turnaround when the separator travels through the turnaround.

3. A linear motion guide unit constructed as defined in claim 2, wherein the sunken relief made on the separator to keep the separator from coming in any interference with the radially inside curved surface in the turnaround lies midway between lengthwise ends of the separator, while the gutters for relief cut in the radially inside curved surface in the turnaround are placed at widthwise opposite sides of the radially inside curved surface in the turnaround, one to each side, to keep the radially inside curved surface in the turnaround from coming in any interference with the separator at raised portions that are left on lengthwise opposite ends across the sunken relief of the separator.

4. A linear motion guide unit constructed as defined in claim 2, wherein sunken relieves made on the separator to keep the separator from coming in any interference with the radially inside curved surface in the turnaround lie on the lengthwise opposite ends of the separator, one to each end, while the gutters for relief cut in the radially inside curved surface in the turnaround is placed midway between the opposite sides of the radially inside curved surface in the turnaround to keep the radially inside curved surface in the turnaround from coming in any interference with the separator at a raised portion that are left midway between the lengthwise opposite sunken relieves of the separator.

5. A linear motion guide unit constructed as defined in claim 1, wherein the separator is made in symmetry on sidewise opposite sides of an axis.

6. A linear motion guide unit constructed as defined in claim 1, wherein the slider is comprised of a carriage including therein the second raceway and the return passage, end caps mounted on forward and aft ends of the carriage, one to each end, and each made therein with the turnaround where the separators together with the rollers are allowed to turn round in rolling direction, end seals attached on end surfaces of the end caps, one to each cap, and a retainer plate fastened to the carriage to extend lengthwise along the carriage to support thereon the rollers.

7. A linear motion guide unit constructed as defined in claim 6, wherein the end caps are each made up of an end cap body and a spacer, which are attached to any one of the forward and aft ends of the carriage, the spacer being to provide the radially inside curved surface of the turnaround, which is partially sunken in to form the gutter for relief, and an end cap body being to provide a radially outside curved surface of the turnaround.

8. A linear motion guide unit constructed as defined in claim 7, wherein the spacer includes a straight area to be conjoined with at least the second raceway on the carriage in flush with one another, and a curved area merging with the straight area.

9. A linear motion guide unit constructed as defined in claim 8, wherein the curved area in the spacer is formed in either the overall circular shape or another shape that is made up of sidewise opposite arcs and a linear area lying midway between the arcs.

10. A linear motion guide unit constructed as defined in claim 8, wherein the gutter for relief formed on the spacer starts with a slope made in the straight area and extends circumferentially along the curved area of the spacer.

11. A linear motion guide unit constructed as defined in claim 7, wherein the track rail is made on the lengthwise side thereof with a first groove to hold therein the retainer plate, the groove being flanked with the first raceways, while the carriage is also made with a second groove to hold the retainer plate, the second groove being flanked with the second raceways lying confronting the first raceways on the track rail.

12. A linear motion guide unit constructed as defined in claim 1, wherein the slider fits over astride the track rail for linear motion relatively to the track rail.

13. A linear motion guide unit comprising; a track rail having a lengthwise side on which a first raceway extends lengthwise thereof, a slider having a second raceway confronting the first raceway and lying for sliding movement relatively to the track rail by virtue of more than one roller that is allowed to roll through a load racecourse defined between the first and second raceways, a separator interposed between any two adjoining rollers so as to be allowed to recirculate together with the rollers through a recirculating circuit that is composed of the load racecourse, turnarounds made in the slider to be connected with the load racecourse, and a return passage made in the slider to be connected with the turnarounds;

wherein the separator is made concaved on forward and aft sides flanked by the adjacent rollers to provide concave surfaces that fit over the rollers in rolling-contact relation, the concave surface having a length and a width that are able to fit substantially over a semicylindrical surface of the roller, wherein the separator has a width making up substantially about 96% of a diameter of the roller and a length reaching substantially about 98% of an axial length of the roller.

14. A linear motion guide unit comprising; a track rail having a lengthwise side on which a first raceway extends lengthwise thereof, a slider having a second raceway confronting the first raceway and lying for sliding movement relatively to the track rail by virtue of more than one roller that is allowed to roll through a load racecourse defined between the first and second raceways, a separator interposed between any two adjoining rollers so as to be allowed to recirculate together with the rollers through a recirculating circuit that is composed of the load racecourse, turnarounds made in the slider to be connected with the load racecourse, and a return passage made in the slider to be connected with the turnarounds;

wherein the separator is made concaved on forward and aft sides flanked by the adjacent rollers to provide concave surfaces that fit over the rollers in rolling-contact relation, the concave surface having a length and a width that are able to fit substantially over a semicylindrical surface of the roller, wherein the slider is comprised of a carriage including therein the second raceway and the return passage, end caps mounted on forward and aft ends of the carriage, one to each end, and each made therein with the turnaround where the separators together with the rollers are allowed to turn round in rolling direction, end seals attached on end surfaces of the end caps, one to each cap, and a retainer plate fastened to the carriage to extend lengthwise along the carriage to support thereon the rollers.

* * * * *